K. E. JOHANSSON.
ANIMAL TRAP.
APPLICATION FILED AUG. 30, 1912.
1,077,912.
Patented Nov. 4, 1913.
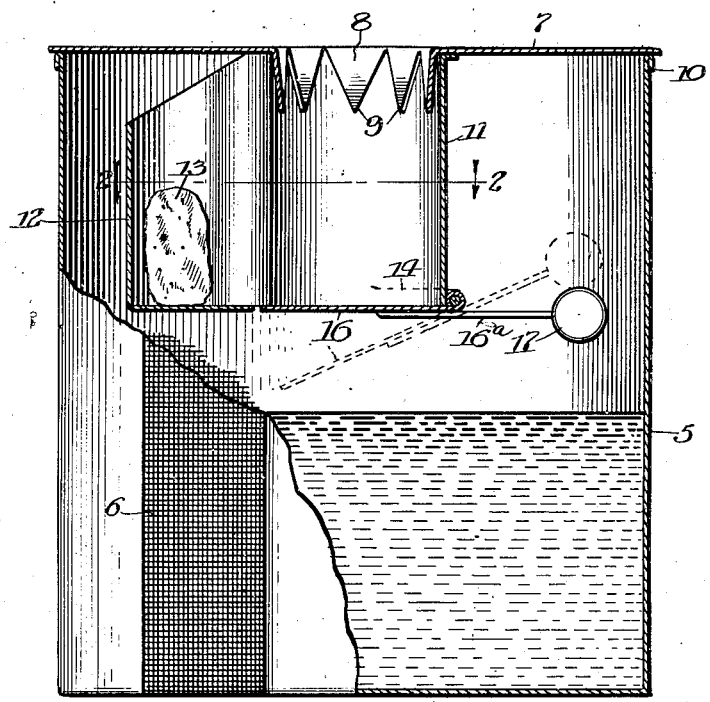
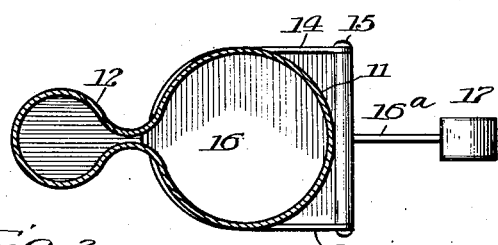
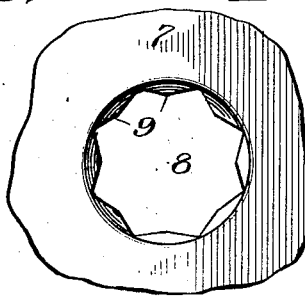
Witnesses
Inventor
Karl E. Johansson
by Chas. C. Tillman
Atty.

UNITED STATES PATENT OFFICE.

KARL E. JOHANSSON, OF CHICAGO, ILLINOIS.

ANIMAL-TRAP.

1,077,912.     Specification of Letters Patent.     Patented Nov. 4, 1913.

Application filed August 30, 1912. Serial No. 717,855.

*To all whom it may concern:*

Be it known that I, KARL E. JOHANSSON, a subject of the King of Sweden, residing at Chicago, in the county of Cook and State of Illinois, have invented a new and useful Improvement in Animal-Traps, of which the following is a specification.

This invention relates to certain new and useful improvements in animal traps, and it consists in certain peculiarities of construction, novel arrangement and operation of the various parts thereof, as will be hereinafter more fully set forth and specifically claimed.

The principal object of the invention is to provide a trap for entrapping and destroying animals of various kinds, such as rats, mice, minks, skunks, and the like, (but it is more particularly intended for entrapping rats), which shall be extremely simple and inexpensive in construction, strong, durable and efficient in operation, and of such character that the trapping portions of the device may be made in different sizes so as to be adapted for trapping animals of various sizes and characteristics, and also that they may be adapted for use on vessels of any preferred kind or size, to the end that said trapping portions of each trap can be carried in stock by merchants, and so that the purchaser can select from such stock the desired size or sizes for the animals to be caught, and for the vessels to be used in connection with the trapping lid or cover of the trap.

Another object of the invention is to provide a trap of the self-setting or ever-set type adapted for catching animals with or without destroying them, capable of effectually preventing the animals from obtaining the bait, so that the trap will remain baited for a considerable time, and will require little or no attention.

Other objects and advantages of the invention will be disclosed in the subjoined description and explanation.

In order to enable others skilled in the art to which the invention pertains to make and use the same, I will now proceed to describe it, referring to the accompanying drawing, in which—

Figure 1 is a view in side elevation, partly in section of a trap embodying the invention, showing by dotted lines the tilted position of the trap door; Fig. 2 is a plan sectional view taken on line 2—2 of Fig. 1 looking in the direction indicated by the arrows, and Fig. 3 is a plan view of a portion of the lid or removable cover of the trap.

Like numerals of reference refer to corresponding parts throughout the different views of the drawings.

The reference numeral 5 designates the vessel, which may be of any suitable size, form and material, but preferably cylindrical in shape as shown, and adapted to contain water. The upper end of the vessel 5, is open, and may be reached by small animals such as mice, by means of a piece of wire gauze 6, attached at its lower end to the bottom of the vessel, and extended vertically on its outer surface, and secured at its upper end to the rim of the vessel. Located on the top of the vessel 5, is a cover 7, which is provided with a central opening 8, the edge of which opening is preferably provided with downwardly extended projections 9, which are slightly contracted toward their lower ends and by preference are punched out of the material comprising the lid or cover 7.

Secured to the lower surface of the lid 7, and circumscribing the opening 8 thereof, is a hollow entrance member 11, which is provided at its wall with a laterally disposed extension or receptacle 12, which is also hollow and extends vertically with respect to the member 11, but terminates at its outer portion at some distance below the upper end of the member 11, so as to permit bait 13, of any desired kind to be inserted between the lid 7, and the open upper portion of the receptacle 12, which is closed at its bottom as clearly shown in Figs. 1 and 2 of the drawings.

The lower end of the entrance member 11, is open and is provided on each of its sides with a horizontally extended arm 14, in the outer portions of which is mounted for rotary movement a pintle 15, on which is secured one end of a trap door 16, which is of sufficient size to close the lower end of the entrance member. Secured to the door 11, about midway between the arms 14, and extended outwardly from the door is an arm 16ª, which has on its outer portion a weight 17, of sufficient size and weight to overbalance the door 16, so as to normally hold it in its closed position.

From the foregoing and by reference to the drawing, it will be readily understood and clearly seen that by placing the lid 7, on the open end of a vessel, which may be of any desired kind, such as a barrel, bucket or other receptacle which will hold water, and by placing bait in the bait receptacle 12, animals will be enticed to climb up the side of the vessel by means of the wire netting 6, when the same is employed, and to enter the opening 8, in an effort to obtain the bait. As they pass into the entrance member 11, it is evident the pointed projections 9, will prevent them withdrawing their bodies from the opening 8, should they desire so to do, and in their efforts to free themselves they will fall onto the trap door 16, which, by reason of the weight of the animal, will be tilted, thus throwing the animal into the water contained in the vessel, where it will be drowned.

It is obvious that by employing a lid with the entrance member, bait receptacle and trap door mounted thereon, that such a lid can be used on any suitable vessel, and that the vessel may be embedded in grain, hay or the ground, so as to expose the lid only, thus rendering it more convenient for the animals to reach the entrance opening, through which they will pass and be trapped and destroyed as above explained.

Having thus fully described my invention, what I claim as new and desire to secure by Letters Patent, is—

1. An animal trap consisting of a vessel, a cover closing the top of the vessel and having an entrance opening, a depending hollow entrance member secured at one of its ends around said opening and having an opening in its other end, a trap door pivotally mounted on the open end of the entrance member and adapted to open and close the same, said entrance member having integral therewith on its side a bait receptacle in communication therewith from its top to its bottom, said bait receptacle having its lower end closed and its upper end open and spaced from the cover to permit of the insertion of bait into said receptacle.

2. An animal trap including a cover for a vessel, said cover having a central opening therein and provided with downward projections at the edge of said opening, a depending hollow entrance member secured to the cover around said projections and having its free end open, said member having at its free or open end a pair of arms extended in parallelism therefrom, a single gravity actuated trap door pivotally mounted on and between said arms and adapted to open and close the free end of the entrance member, said entrance member having at its side a bait receptacle in communication therewith throughout its length, said bait receptacle having its lower end closed and its upper end open and spaced from the cover to permit of the insertion of bait into said receptacle.

In witness whereof, I have hereunto subscribed my name, this 27th day of August A. D. 1912, in the presence of two subscribing witnesses.

KARL E. JOHANSSON.

Witnesses:
Chas. C. Tillman,
A. S. Phillips.